UNITED STATES PATENT OFFICE.

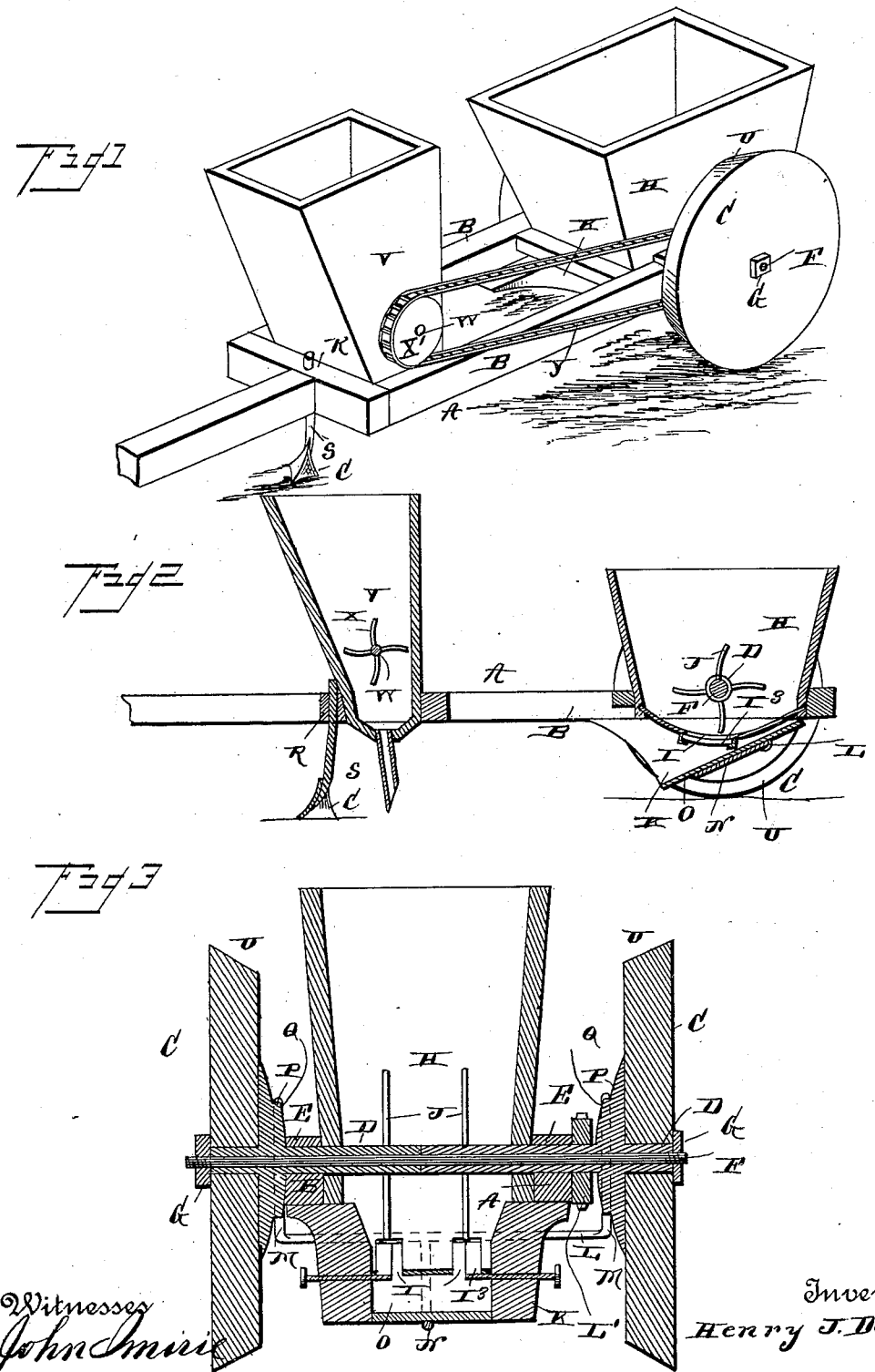

HENRY JACKSON DAVIS, JR., OF CENTRAL INSTITUTE, ALABAMA.

COMBINED SEED-PLANTER AND FERTILIZER-DISTRIBUTER.

SPECIFICATION forming part of Letters Patent No. 406,127, dated July 2, 1889.

Application filed March 15, 1889. Serial No. 303,449. (No model.)

*To all whom it may concern:*

Be it known that I, HENRY JACKSON DAVIS, Jr., a citizen of the United States, residing at Central Institute, in the county of Elmore and State of Alabama, have invented a new and useful Improvement in Combined Seed-Planter and Fertilizer-Distributer, of which the following is a specification.

This invention relates to combined seed-planters and fertilizer-distributers; and it has for its object to provide a device of this class which shall be simple in construction, durable, and easily operated.

The invention consists in the improved construction and combination of parts which will be hereinafter fully described, and particularly pointed out in the claims.

In the drawings, Figure 1 is a perspective view of my improved planter and fertilizer-distributer. Fig. 2 is a vertical longitudinal sectional view of the same. Fig. 3 is a transverse vertical section taken through the hopper and operating mechanism of the seed-planting device.

The same letters refer to the same parts in all the figures.

A designates the frame, which consists of longitudinal beams B B, suitably connected at their front and rear ends, and the front end of which is provided with suitable means for the attachment of the draft.

C C designate the wheels, the hubs of which are provided with cylindrical extensions D D, which are extended inwardly through boxes or bearings E E, mounted upon the side beams of the frame, and the ends of which are in contact with each other. The axle F extends through the hubs and their extensions, and the wheels are secured thereon by means of nuts G at the ends of said axle.

H designates the seed box or hopper, which is mounted upon the frame between the side beams B, and through the sides of which the cylindrical sleeves D of the wheels extend. The bottom of the hopper is segmental in shape, and it has the slots I of suitable dimensions for the escape of the seed, and gates $I^3$ to regulate the escape. The seed is forced out through the slot I by means of the rearwardly-curved stirrers or fingers J J, mounted upon the cylindrical sleeves D, and which serve to agitate the seed contained in the hopper and force it out through the slot in the bottom of the hopper.

Secured to the under sides of the side beams B B of the frame are a pair of guard-plates K K, the rear ends of which have bearings for a transverse shaft L, the ends of which are provided with cranks M. The central portion of the shaft L has a forwardly-extending arm N, on which is mounted a plate O, adapted to vibrate between the guard-plates K K when the shaft is oscillated. This is accomplished by means of cam-plates P P, secured upon the inner sides of the wheels C of the machine, said cam-plates consisting of disks provided with any desired number of radial ribs Q, adapted to engage the cranks M of the shaft L, and thus oscillate the said shaft, so as to raise the plate O attached thereto, the forward end of said plate dropping by its own weight when the cranks at the ends of the shaft L are out of contact with the ribs upon the cam-plates. It will be seen that by this construction the vibrating plate or tongue O forms an automatic cut-off for regulating the escape of seed from the hopper and causing the seed to be dropped at regular intermittent intervals.

Suitably secured to a cross-bar R, connecting the side beams of the frame, is a vertically-adjustable standard S, the lower end of which carries a furrow-opener C. The rims of the supporting-wheels of the machine are beveled, as will be seen at U U, so as to compress the earth in the direction of the furrow, thus serving to cover the seed and compress the soil.

Suitably mounted upon the frame in front of and above the seed-hopper is a hopper V, adapted to contain any suitable fertilizing material. The sides of said hopper have bearings for a transverse shaft W, equipped with fingers or stirrers X, adapted to agitate contents of hopper V and to force it out through a slot or opening in the bottom thereof. The shaft W is operated by means of a chain or belt Y, running over a pulley or sprocket-wheel X', mounted upon the said shaft, and over a band or sprocket wheel L', suitably mounted upon one of the cylindrical extensions B of either of the supporting-wheels of the machine. A suitable spout may be used to convey the fertilizing material from the hopper V to the point where it is desired to deposit the same. The fertilizer-hopper may also, when desired, be provided with an automatic cut-off identical in construction with that provided for the seed-hopper.

From the foregoing description, taken in connection with the drawings hereto annexed, the operation and advantages of this invention will be readily understood.

The construction is simple and inexpensive, and the device may be readily operated by any one without previous instruction.

It will be also seen that the supporting-wheels being independent of each other and each having a separate seeding mechanism, the planter will operate when only one of the wheels revolves—as, for instance, in turning at the end of the row.

Having thus described my invention, I claim—

1. In a cotton-seed planter, the combination of the frame, the hopper mounted upon the same, and the wheels, the hubs of which are provided with cylindrical sleeves or extensions journaled in suitable boxes or bearings in the frame, and provided within the hopper with stirrers or agitating-fingers, and the shaft or axle extending through the hubs and sleeves of the wheels and provided with nuts at each end, substantially as set forth.

2. In a cotton-seed planter, the combination, with a frame and hopper, of the independently-revoluble wheels having cylindrical sleeves extending into the hopper, and provided with the stirrers or agitating-fingers, substantially as set forth.

3. In a cotton-seed planter, the combination, with the frame and hopper, of the guard-plates extending downwardly from the frame on either side of the hopper, the transverse shaft having cranks at either end, the tongue or cut-off plate mounted upon the said shaft, and the radially-ribbed cam-plates mounted upon the inner sides of the wheels and adapted to engage the said crank-shaft, substantially as set forth.

4. In a cotton-seed planter, the combination, with the frame and hopper, of the independently-revoluble wheels mounted in the frame and having cylindrical sleeves extending into the hopper and provided with stirrers or agitating-fingers, the guard-plates extending downwardly on either side of the hopper, the crank-shaft journaled transversely in said guard-plates and having the vibrating tongue or cut-off plate secured thereto, and the cams secured to the inner sides of the wheels and adapted to engage the crank-shafts, substantially as set forth.

5. In a planter, the combination, with the frame and hopper, of the independently-revoluble wheels, each operating a separate seeding mechanism, and said wheels having broad inclined rims or treads to cover and compress the soil about the seeds, substantially as set forth.

In testimony that I claim the foregoing as my own I have hereto affixed my signature in presence of two witnesses.

HENRY JACKSON DAVIS, Jr.

Witnesses:
  E. M. WILLIAMS, Sr.,
  E. M. WILLIAMS, Jr.